(12) United States Patent
Cummings

(10) Patent No.: US 6,490,866 B1
(45) Date of Patent: Dec. 10, 2002

(54) GENERATION OF ELECTRICITY AND THE TREATMENT AND DISPOSAL OF SEWAGE

(75) Inventor: Donald R. Cummings, Katoomba (AU)

(73) Assignee: D.U.T. Pty Ltd., New South Wales (AU)

( * ) Notice: Subject to any disclaimer, the term of this patent is extended or adjusted under 35 U.S.C. 154(b) by 0 days.

(21) Appl. No.: 09/647,374

(22) PCT Filed: Apr. 6, 1999

(86) PCT No.: PCT/AU99/00251

§ 371 (c)(1),
(2), (4) Date: Nov. 28, 2000

(87) PCT Pub. No.: WO99/51867

PCT Pub. Date: Oct. 14, 1999

(30) Foreign Application Priority Data

Apr. 3, 1998 (AU) .............................................. PP2749

(51) Int. Cl.[7] .............................................. F02C 6/10
(52) U.S. Cl. .......................... 60/775; 783/784; 422/38; 422/307
(58) Field of Search .................... 60/783, 784, 39.53, 60/775; 422/38, 298, 305, 307

(56) References Cited

U.S. PATENT DOCUMENTS 4,571,949 A * 2/1986 Moke .......................... 60/655

6,171,499 B1 * 1/2001 Bouchalat .................... 210/603

FOREIGN PATENT DOCUMENTS

DE 3805553 * 8/1989
JP 6-285486 * 10/1994

* cited by examiner

Primary Examiner—Louis J. Casaregola
(74) Attorney, Agent, or Firm—Sheridan Ross P.C.

(57) ABSTRACT

The invention provides a method and apparatus for the generation of electricity combined with the further treatment of sewage from a sewage treatment plant. In one form of the invention a stream of compressed air/contaminated air (108, 110) is passed to a mixing device (18) where it is mixed with a stream of introduced fuel gas (112). The mixture is combusted and the resultant gases are fed to the expansion chamber (6) of a gas turbine which drives an alternator (10) thus generating electricity. Rather than simply dissipate them to atmosphere, the gases (126) are utilized in the heating and disinfection of sewage (148) from an initial sewage treatment plant. The thus disinfected sewage (150) passes to a pressure vessel (12) wherein it encounters and saturates the stream of compressed air/contaminated air (108, 110) passing to the mixing device (18).

21 Claims, 1 Drawing Sheet

GENERATION OF ELECTRICITY AND THE TREATMENT AND DISPOSAL OF SEWAGE

BACKGROUND

Figure 1:
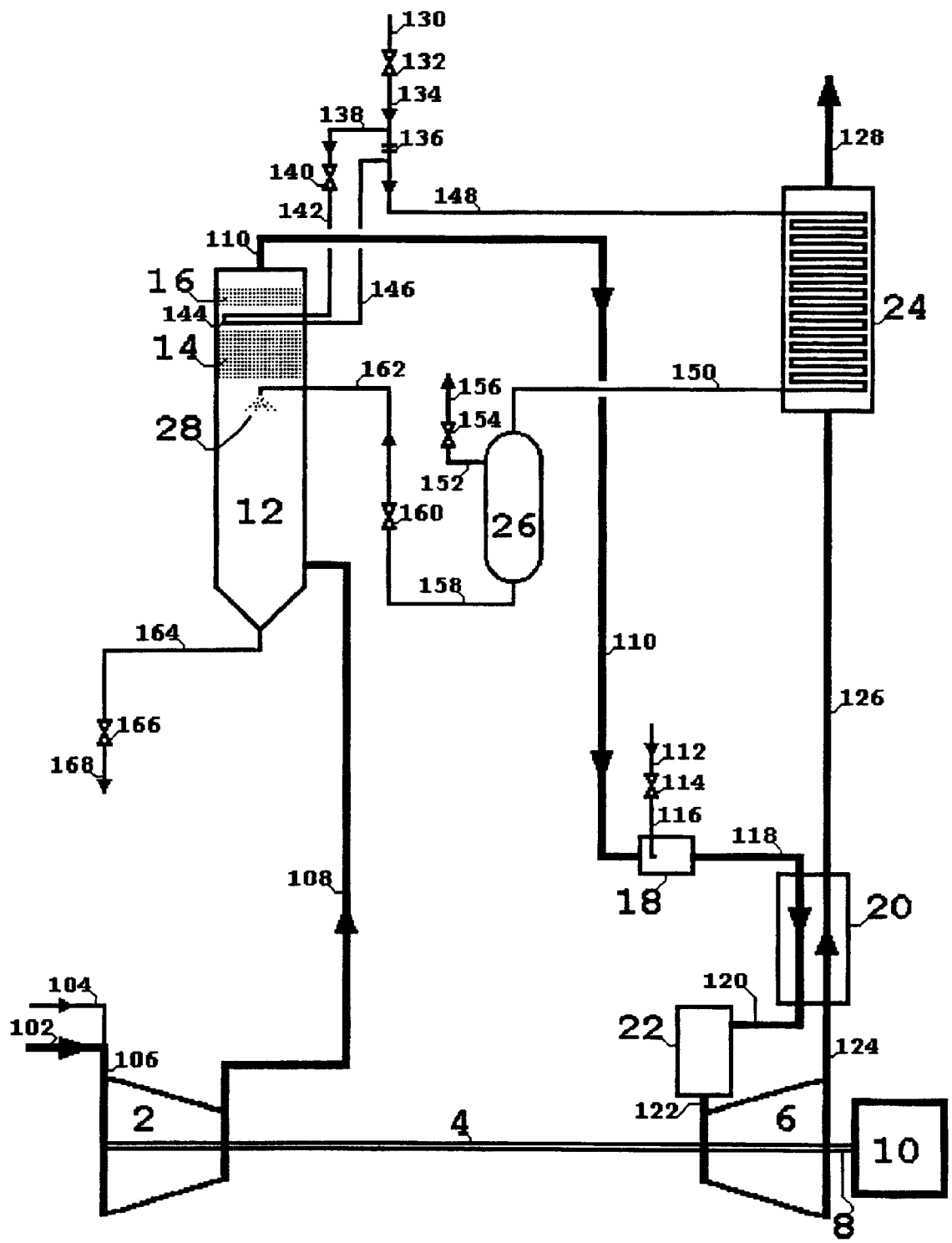

The average consumption of power in a typical Australian community is about 1 kWhr per hour per person. The production of sewage is about 200 litres per day per person. At present, the provision of electricity is not seen as being complementary to, or logically associated with, the treatment and possible re-use of sewage.

Sewage

Treated sewage, in many instances, is simply discharged into the sea or into inland river systems and the enhanced nitrogen and phosphorus content of sewage, as opposed to the raw water supplied to households, is associated with the production of algal "blooms" in rivers and waterways. This has resulted in attention being focussed on reducing the nitrogen and phosphorus content of treated sewage. Reductions are of course possible with complex sewage treatment and/or including processing operations such as the addition of chemicals and further settling, biological processes, filtration operations and the like.

It is possible to use treated sewage with a high nitrogen and phosphorus content for irrigation, and in the production of crops, fodder and the growth of trees, lawns, gardens and the like, effective use being made of the nitrogen and phosphorus content and the water run off having reduced levels of nitrogen and phosphorus. However a problem with the use of treated sewage for irrigation is that the colliform and pathogen content can typically be about 100–200 units per 100 ml. This can result in a number of problems and disadvantages (such as a significant health risk, the relocation of people during and for a period after the application of treated sewage, the non use of resultant agricultural produce for human consumption unless the end product is cooked under controlled conditions). For these reasons treated sewage cannot be generally used for normal agriculture, accessible parklands, external washing purposes or as a household "grey" water.

Further, in some locations in NSW for example, whilst there is a demand for approval of building lots for further construction of houses, such approvals are being impeded by the effluent problems associated with conventional sewage treatment plants. There is also the perceived need to preserve and enhance the regions near inland creeks and waterways so as to provide visually attractive "green belts" and recreational areas which, under normal conditions, require the use of substantial amounts of water for strong plant and tree growth.

It is known that the term sewage may also incorporate various industrial effluents, food processing wastes, agricultural wastes and other waste water streams which may or may not contain pathogens and the like but which may be mixed with household type sewage. Again, this cannot be used with safety.

It is also known that the anaerobic digestion of sewage converts sewage organic matter to methane and carbon dioxide. However, due to its high carbon dioxide content and low pressure this gas can be expensive to compress to enable its use in gas turbines. Anaerobic digestion requires heat which can be costly.

A still further problem with sewage plants is the associated gas and odour releases. It is known that sewage sludge produced in sewage treatment decomposes to produce methane and foul smelling sulphur-containing gases such as hydrogen sulphide. There is a need to eliminate the foul odours and if possible utilize these gases.

Electricity

A further general problem with population growth and new housing is the recognised need to reduce greenhouse gas emissions, which are predominantly associated with the production of electricity. In recent years the trend to install large coal-fired power stations remote from populous areas has been the preferred mode of supplying power (e.g., in NSW). However, this system has the problem of creating substantial greenhouse gas emissions compared to gas-fuelled power plant and the need for high tension transmission corridors which are now seen as unsightly and a potential source of electromagnetic radiation associated with unquantifiable health risks. A further problem with coal field-located coal-fired power plant, and long high voltage transmission systems, is the appreciable amount of power lost in electricity transmission.

Whilst changing from remote coal-fired power plant to gas-fired plant has the desired benefit of reducing carbon dioxide emissions associated with power generation, the generation of gas-based power in populous areas has the disadvantage of discharging nitric oxide (NOX) emissions from power generation in such areas (it is known that NOX emissions are a precursor to a range of deleterious tropospheric reactions such as ozone and smog formation). In many populous areas strict controls are placed on power generation plant with a best achievable NOX content of the exhaust from gas turbines being, typically, about 20 ppm. This may be regarded as being acceptable by some authorities. However there is a perceived need, and a known problem, in lowering NOX emissions and a major problem in being able to lower emissions in gas turbine exhausts below 5 ppm. For example, Los Angeles, which is known to have severe tropospheric pollution problems, has a current requirement for NOX discharges in gas turbines to be less than 5 ppm. At present this level of NOX emissions cannot be achieved with commercially available gas turbines.

The Invention

By means of this invention the described problems associated with the disposal of sewage and treated sewage, and the generation of power are addressed and, at least in part, are solved.

Accordingly, in one aspect, the invention provides a method for the generation of electricity and the complementary purification of sewage characterized in that:

(I) exhaust gases, from a mixture of compressed air or compressed air and contaminated air and fuel gas combusted in a gas turbine for the generation of electricity, are utilized in a first step of heating and disinfecting a stream of sewage from a sewage treatment plant; and (ii) the thus disinfected hot sewage stream is contacted with, and saturates, a stream of the compressed air or compressed air and contaminated air prior to its admixture with the fuel gas.

In a further aspect, the invention provides a method for the production of electricity and the complementary purification of sewage comprising the following steps:

(I) introducing, into a heating vessel, a stream of sewage from a sewage treatment plant;

(ii) introducing, into the compressor of a gas turbine, a stream of air or optionally a stream of air and contaminated air;

(iii) conveying the compressed air or compressed air and contaminated air to a mixing device wherein the compressed air/contaminated air is mixed with a stream of fuel gas separately introduced at the mixing device;

(iv) combusting the mixture of compressed air/contaminated air and fuel gas to produce hot gases which are fed to the expansion stage of the turbine which drives an alternator to produce electricity;

(v) conveying exhaust gases from the expansion stage of the turbine to the heating vessel containing the introduced stream of sewage, the sewage being heated to a temperature, and retained at the temperature for a period of time, sufficient to disinfect the sewage and thus ensure that all pathogens and bacteria in the sewage are effectively destroyed;

(vi) introducing the thus disinfected hot sewage to a pressure vessel where it is brought into contact with, and saturates, the stream of compressed air or compressed air/contaminated air being conveyed from the compressor to the mixing device; and (vii) discharging the thus purified and disinfected sewage for use as required.

There is also provided, in accordance with the invention, apparatus for the generation of electricity and the complementary purification of sewage comprising in combination:

(I) a heating vessel;

(ii) means for introducing a stream of treated sewage to the heating vessel;

(iii) means for heating the treated sewage in the heating vessel to disinfect the treated sewage, the heating means comprising the exhaust gases from a mixture of separately introduced compressed air or compressed air and contaminated air and fuel gas combusted in a gas turbine to generate electricity;

(iv) means for conveying the introduced pre-mixed compressed air/contaminated air to a device where it is mixed with the introduced fuel gas;

(v) means for introducing the hot disinfected sewage into the compressed air/contaminated air conveying means, the disinfected sewage thereby coming into contact with and saturating the compressed air/contaminated air being conveyed to the mixing device.

The invention further provides apparatus for the generation of electricity and the complementary purification of sewage comprising in combination:

(I) a heating vessel;

(ii) means for introducing a stream of treated sewage to the heating vessel;

(iii) a gas turbine comprising a compression stage, for compression of air or air and contaminated air, and an expansion stage which drives the compression stage and an alternator to generate electricity;

(iv) means for conveying the compressed air or compressed air and contaminated air through a pressure vessel, wherein it is saturated, to a mixing device where the compressed air/contaminated air is mixed with a separately introduced stream of fuel gas;

(v) a combustion chamber wherein the mixture of compressed air/contaminated air and fuel gas is combusted and from whence the hot resultant gases are conveyed to the expansion stage of the gas turbine;

(vi) means for heating the treated sewage in the heating vessel to disinfect the heated sewage, the heating means comprises the exhaust gases from the expansion stage of the gas turbine;

(vii) means for introducing the hot disinfected sewage into the compressed air/contaminated air conveying means, the disinfected sewage thereby coming into contact with and saturating the compressed air/ contaminated air being conveyed to the mixing device.

The invention will now be described with sequential reference to (I) preferred sub-generic features, (ii) a specified embodiment itself described with reference to the accompanying schematic drawing, and (iii) a working example (likewise described in conjunction with and reference to the illustrated drawing). The various integer(s) constituting the preferred embodiments of the several means referred to above will be readily identifiable in the detailed description and drawing. It is to be understood that, being in respect of preferred/illustrative features, this description should not be limitatively construed.

For convenience, the expression "compressed air or compressed air and contaminated air" may frequently be simply expressed as "compressed air/contaminated air".

In preferred forms of the invention:

The temperature to which the sewage is heated—to ensure disinfection of the sewage and destruction of resident pathogens, colliforms and the like—is generally in the range 100–180° C., more preferably 130–150° C. The residence time at the operating temperature is typically in excess of five minutes.

The turbine is a recuperated gas turbine.

The mixture of compressed air/contaminated air and fuel gas is combusted in a combusted of the type described in co-pending application PCT/AU95/00719.

The contaminated air introduced into the compressor of the turbine is comprised of foul air and methane gas from the sewage treatment plant (the foul air/methane being thereby incinerated with distribution of the foul odours and utilization of the energy value of the methane).

The hot disinfected sewage is introduced into the pressure vessel in which it comes into contact with the compressed air/contaminated air passing through the vessel to the mixing device, by means of a spray system/liquid distribution device.

The pressure vessel is also equipped with gas/liquid contacting mist eliminator systems through which the saturated stream of compressed/contaminated air passes en route to the mixing device.

a portion of the stream of treated sewage passing from the sewage treatment plant to the heating vessel is diverted to a cooling coil in the pressure vessel and thence back to the stream.

The fuel gas may be derived from coal or other solid carbonaceous fuel gasification as described in co-pending application PCT/AU96/00483.

Proceeding to the description of the particular embodiment which is schematically illustrated in accompanying FIG. 1 of the drawings, the apparatus by means of which the method of the invention is carried out, and the components thereof, are first identified by reference numerals (and, as appropriate, brief indications of their respective functions). Thereafter the preferred method of generation/production is operationally described.

In FIG. 1 item-2 is the compression stage of a gas turbine, numeral 4 denotes the shaft connecting compression stage 2 to the expansion stage 6 of the gas turbine which drives both the compressor 2 and, via shaft 8, an alternator 10. The alternator 10 generates electricity. A pressure vessel 12 houses a spray system or liquid distribution device 28, and also two gas/liquid contacting mist eliminator systems 14 and 16. These systems are of a type well known in the art and may be of proprietary knitted mesh or constituted by mist eliminator pads. Their function will be explained below. Item-18 denotes a mixing device for air and fuel gas, such as natural gas, 20 denotes a recuperator and 22 denotes a combustion chamber. In this embodiment of the invention, the combustion chamber is of the type described in co-pending patent application Ser. No. PCT/AU95/00719. The chamber is fed with a pre-mixed air and fuel gas mixture.

Item-24 denotes an exhaust gas-fed vessel for heating incoming sewage. Its function will be elaborated below. Item-26 denotes a sewage storage tank likewise to be further elaborated.

Air is fed to the gas turbine compressor 2 via duct 102. Odour-contaminated, and possibly methane-containing air from a sewage treatment plant, is also added via duct or pipeline 104. The thus mixed air and contaminated air is fed to the gas turbine compressor 2 via duct 106. Duct 106 may contain a filtration device or devices.

Compressed air and compressed contaminated air leaves the gas turbine compressor 2 via pipeline 108 and passes to the pressure vessel 12 where the upwardly moving air is contacted with hot disinfected sewage from the spray system/liquid distribution device (see further below). The thus saturated and adiabatically cooled air then passes through the mist eliminator 14, and then passes over cooling coils/pipeline 144. Condensate from the coil 144 drops down and through the mist eliminator 14, thereby washing and assisting in the substantial removal of salts containing liquid droplets and any solids introduced through the liquid spray/distribution device 28. The now saturated air then passes through mist eliminator 16 to remove any remaining water droplets before passing via pipeline 110 to gas mixing device 18.

Fuel gas for the turbine, to be combined with the gas travelling via pipeline 110, is fed via pipeline 112 and control valve 114 and pipeline 116 to the fuel gas and air mixing device 18. The control of the gas flow by valve 114, is carried out in known manner. The fuel gas and air mixture which is substantially below the lower explosive limit for the mixture is fed to the combustion chamber 22 via recuperator 20 where it is preheated. Recuperation prior to combustion increases the efficiency of the turbine. In the combustion chamber the fuel gas is combusted and the hot, resultant gases are fed via duct 122 to the expansion stage 6 of the turbine. The expansion stage drives the compressor 2, and the alternator 10, which generates electricity.

Exhaust gases from the expansion stage 6 leave via duct 124 and pass to the recuperator 20 where they are partially cooled. The partially cooled exhaust gases then pass via duct 126 to the heater 24 where they perform the heating function to be further explained. On leaving the heater they are exhausted to atmosphere via duct 128.

Treated sewage from a sewage treatment plant, which may typically contain in excess of 100 colliform units per 100 ml is introduced under pressure via pipeline 130 to a control valve 132 which controls the rate of flow. The sewage then passes via pipeline 134 and restriction device or restriction orifice 136, and thence via pipeline 148 to the heater 24. Part of the treated sewage in pipeline 134 is diverted via pipeline 138 via control valve 140 and pipeline 142 to the cooling coil 144 and thence via pipeline 146 back to pipeline 148. The flow of the sewage in cooling coil 144 is sufficient to cool the saturated air leaving mist eliminator 14 to below its saturation temperature, prior to passing over the cooling coil so as to produce a flow of substantially pure condensate to reflux over the surface of mist eliminator 14 and wash any dissolved solids and entrained solid particles from the ascending saturated air.

The treated sewage entering the heater 24 is heated to 130 to 150° C. and then passes via pipeline 150 to the storage tank 26. The temperature in the heater 24 and the storage tank 26 is maintained at 130–150° C. The residence time at this high temperature ensures that all pathogens and bacteria in the treated sewage are effectively destroyed by known autoclaving techniques.

In operation, the storage tank 26 will normally be full of pressurised, heated liquid sewage. However, in the event of some malfunction (e.g., poor or faulty control causing the sewage to overheat and start to boil) phase separation will occur in tank 26 and a level device (not shown) will detect the presence of steam. System control mechanisms (not shown) can then, for example, increase the sewage input flow through control valve 132 and/or open safety valve 154 to allow steam to escape via pipelines 152 and 156 (to atmosphere at a suitable and safe location).

In an alternative (not illustrated) hot turbine exhaust gas can be by-passed around the heater 24, emergency level controls and alarms will shut off the various valves and other mechanisms. Such safety devices (to protect the overall system and to comply with safety regulations) will be within the knowledge of those skilled in the art of process design and plant safety.

The hot, disinfected sewage leaving storage tank 26 passes via pipeline 158, control valve 160 and pipeline 162 to the spray system/liquid distributer 28 in pressure vessel 12. Here, the hot treated and disinfected sewage passing downwardly, is contacted with and saturates the compressed air passing upwardly in vessel 12. For the sake of simple illustration, the sewage air contact zone in vessel 12 is simply shown as an open space. However, it will be understood that a known contacting system (such as distillation-type trays, a packing arrangement such as rashig rings or the like, a disk and doughnut-type tray arrangement or other known liquid/gas contacting device or devices) is employed.

The control valve 160, controlling the passage of the treated disinfected sewage, can be a pressure control device. It will maintain a suitable pressure and temperature of the sewage, leaving heater/tank 24/26, in a single, liquid phase at up to typically 150° C. (and below the boiling point of the liquid at that pressure).

The hot, disinfected, treated sewage leaves the pressure vessel 12 via pipeline 164, control valve 166, and pipeline 168. It passes to a sewage disposal system (now shown) which can typically be a cooler and storage tank. This hot treated sewage can be used as a source of process or building heating. It may also be used to pre-heat incoming sewage.

Maintenancewise, the pipes in the heater 24 may be periodically cleaned by the injection of ass beads or sand or the like into pipeline 130 or pipeline 148. The sand or beads can be separated in vessel 26 which may be suitably modified for the purpose. Beads or sand moved from vessel 26 may be recycled for re-use.

In Operation

Sewage, from a sewage treatment plant, is introduced via pipe 130 and passes to a hot water heater 24. In the heater it is subjected to exhaust gases (see below). The sewage from heater 24 travels via pipe 150 to heated sewage storage tank 26.

The sewage in heater 24 and in storage tank 26 is maintained at elevated temperature (e.g., 130–150° C.) for a sufficient time to ensure that all pathogens and bacteria in the sewage are destroyed.

The disinfected sewage then passes from the tank 26 via pipeline 158/162 to a spray distribution device 28 in the pressure vessel 12. The sewage exits device 28 and passes downwardly through, and saturates, a stream of upwardly rising compressed air (see below) from compressor 2. The sewage exits the apparatus from pipe/valve 164/168.

The exhaust gases that pass through the water heater are derived as follows: Ordinary air mixed with contaminated air enters the compressor 2 of a turbine. The compressed air/contaminated air passes upwardly through pressure vessel 12 (where it encounters the sewage exiting the spray decompression device 28) and thence, as saturated air via pipe 110, to a mixing device 18 where it is mixed with fuel gas for the turbine introduced at pipeline 112. The saturated air/fuel gas mixture passes to combustion chamber 22. The added water vapour increases the mass flow passing to the combustion chamber. The hot resultant gases from the combustion chamber pass to the expansion stage 6 of the turbine which drives both the compressor 2 and an alternator 10 which generates electricity. The exhaust gases pass to the heater 24, performing the function as above described, and thence to atmosphere.

Summarising the above operation, the generation of electricity is combined with the further treatment of sewage from a sewage treatment plant. A stream of compressed air/contaminated air is passed to a mixing device where it is mixed with a stream of introduced fuel gas. The mixture is combusted and the resultant gases are fed to the expansion chamber of a gas turbine which drives an alternator thus generating electricity. Rather than simply dissipate them to atmosphere, the exhaust gases are utilized in the heating and disinfection of sewage from an initial sewage treatment plant. The thus disinfected sewage passes to a pressure vessel wherein it encounters and saturates the stream of compressed air/contaminated air passing to the mixing device.

In the foreshadowed example of the invention which is presented with reference to accompanying FIG. 1:

(a) The gas turbine system, items 2, 4, 6, 8, 10, 20, is a recuperated 3000R Centaur turbine (as manufactured by Solar Gas Turbines).

(b) The combustor 22 is as described in co-pending patent application Ser. No. PCT/AU9500719.

(c) Item-12 is a pressure vessel of 1.2 metres diameter with the lower zone below.

(d) Item-14 is 3 metres high above the dished end with the lower 0.5 metres being the separated and partially cooled sewage. It is 0.5 metres of "knitted" metal mesh.

(e) Item-16 is a further 0.5 metres of "knitted" metal mesh designed to eliminate mist particles down to and including particles of 1 micron.

(f) Item-144 is 75 metres of 25 mm n.b. pipe arranged in 5 horizontal "pancakes" of pipe spaced at 80 mm centres with a flowrate of 0.6 litres per second of sewage inside the pipe.

(g) Item-26 is a vertical cylindrical vessel of 1.5 metres dia and 3.0 metres between dished ends.

(h) Item-24 is a rectangular shaped heater of mild steel construction with internal insulation and internal, overlapping, expandable sheet steel lining with 5 horizontal gas passes each 10.5 metres long and 1.2×1.2 metre internal cross section.

(i) The sewage heating pipe 148 is a single pass of 80 mm n.b. (88.9 mm o.d.) steel pipe on 137 mm square pitch arranged in 5 bundles, one bundle per gas pass with each bundle having 64 tubes with U-bends and each tube 10 metres long, i.e., a total straight tube length of 3,200 metres.

| | |
|---|---|
| Air temperature leaving the compressor, Item-2 | 288° C. |
| Air/water vapour temperature leaving item-16 | 120° C. |
| Exhaust temperature leaving item-24 | 150° C. |
| Temperature in pipeline 150 | 140° C. |
| Temperature exit item-22, inlet item-6 | 871° C. |
| The ISO rating of a standard unmodified turbine | 2.55 MW |
| The ISO efficiency of a standard unmodified turbine | 32% |
| Air flow to the turbine | 17.9 Kg per second |
| The untreated sewage flow passing via pipeline 130 | 8.5 liters per second |
| The ISO efficiency of the modified turbine | 39% |
| The ISO power rating of the modified turbine | 3.68 MW |
| Water vapour added to air flow leaving item-12 | 1.5 Kg per second |
| Hot, treated sewage leaving pipeline 168 | 7.0 liters per second |
| Pressure upstream of valve 160 | 700 kPa absolute |
| NOX in exhaust leaving 128 | less than 5 p.p.m. |

It will of course be understood that, within the ambit of the invention, the above described particular embodiment can be varied and extended in many respects. For example:

Selected bacteria can be added to the disinfected sewage, which can be held under optimum conditions of temperature and aeration for rapid growth of said bacteria, to aid decomposition of soluble and particulate matter in the effluent.

To further increase the evaporation of water vapour from the sewage, and the power output of the gas turbine, the partially cooled sewage can be returned, further heated by turbine exhaust gases, and reinjected into the saturated compressed air.

The hot disinfected sewage leaving the apparatus can be used directly or indirectly to provide industrial process, commercial or household heating.

At least part of the heat in the hot disinfected sewage leaving the apparatus can be used to heat and aid anaerobic digestion of sewage within the sewage plant.

In conclusion the invention provides an improvement over the current, commercial means of providing power, namely conventional coal or gas turbine power stations. In addition, treated sewage can be safely re-used for gardening, exterior washing, toilet flushing and the like rather than simply discharged to waste. It will thus be seen that, by the invention, a substantial contribution to the art has been made.

The claims defining the invention are as follows:

1. A method for the generation of electricity and the complementary purification of sewage, comprising:

(i) heating and disinfecting a stream of sewage from a sewage treatment plant utilizing exhaust gases from a mixture of air and fuel gas combusted in a gas turbine for the generation of electricity; and (ii) contacting the thus disinfected hot sewage stream with, and saturating, a stream of the air prior to its admixture with the fuel gas.

2. A method for the production of electricity and the complementary purification of sewage comprising the following steps:

(i) introducing, into a heating vessel, a stream of sewage from a sewage treatment plant;

(ii) introducing, into the compressor of a gas turbine, a stream of air;

(iii) conveying the compressed air to a mixing device wherein the compressed air is mixed with a stream of fuel gas separately introduced at the mixing device;

(iv) combusting the mixture of air and fuel gas to produce hot gases which are fed to the expansion stage of the turbine which drives an alternator to produce electricity;

(v) conveying exhaust gases from the expansion stage of the turbine to the heating vessel containing the introduced stream of sewage, the sewage being heated to a temperature, and retained at the temperature for a period of time, sufficient to disinfect the sewage and thus ensure that all pathogens and bacteria in the sewage are effectively destroyed;

(vi) introducing the thus disinfected hot sewage to a pressure vessel where it is brought into contact with, and saturates, the stream of air being conveyed from the compressor to the mixing device; and (vii) discharging the thus purified and disinfected sewage for use as required.

3. A method as claimed in claim 2 wherein the disinfected hot sewage is introduced to the pressure vessel through a spray liquid distribution device.

4. A method as claimed in claim 2 wherein, following saturation, a stream of saturated air traverses a liquid contacting mist eliminator system in the pressure vessel whereby mist, liquid droplets and any solid particles introduced through the liquid spray distribution device are removed.

5. A method as claimed in claim 2 wherein a portion of the stream of treated sewage passing to the heating vessel is diverted to a cooling coil above a mist eliminator system in the pressure vessel and thence back to the stream and the cooled gases pass through a further mist eliminator system above the cooling coil such that condensed water droplets are recovered and flow down through the initial mist eliminator.

6. A method according to claim 1 further comprising cooling the air stream using a cooling medium.

7. A method as claimed in claim 2 wherein the gas turbine is a recuperated gas turbine.

8. A method as claimed in claim 2 wherein, in the step of heating and disinfecting the treated sewage, the sewage is heated to a temperature of 100–180° C., and retained at that temperature for a period in excess of five minutes.

9. A method as claimed in claim 8 wherein the temperature range is 130–150° C.

10. Apparatus for the generation of electricity and the complementary purification of sewage comprising in combination:

(i) a heating vessel;

(ii) means for introducing a stream of treated sewage to the heating vessel;

(iii) means for heating the treated sewage in the heating vessel to disinfect the treated sewage, the heating means comprising the exhaust gases from a mixture of separately introduced air and fuel gas combusted in a gas turbine to generate electricity;

(iv) means for conveying the introduced pre-mixed air to a device where it is mixed with the introduced fuel gas;

(v) means for introducing the hot disinfected sewage into the air conveying means, the disinfected sewage thereby coming into contact with and saturating the air being conveyed to the mixing device.

11. Apparatus for the generation of electricity and the complementary purification of sewage comprising in combination:

(i) a heating vessel;

(ii) means for introducing a stream of treated sewage to the heating vessel;

(iii) a gas turbine comprising a compression stage, for compression of air, and an expansion stage which drives the compression stage and an alternator to generate electricity;

(iv) means for conveying the compressed air through a pressure vessel, wherein it is saturated, to a mixing device where the compressed air is mixed with a separately introduced stream of fuel gas;

(v) a combustion chamber wherein the mixture of compressed air and fuel gas is combusted and from whence the hot resultant gases are conveyed to the expansion stage of the gas turbine;

(vi) means for heating the treated sewage in the heating vessel to disinfect the heated sewage, the heating means comprises the exhaust gases from the expansion stage of the gas turbine;

(vii) means for introducing the hot disinfected sewage into the compressed air conveying means, the disinfected sewage thereby coming into contact with and saturating the compressed air being conveyed to the mixing device.

12. Apparatus as claimed in claim 11 wherein the pressure vessel incorporates a spray liquid distribution device through which the hot disinfected sewage is fed into contact with the compressed air.

13. Apparatus as claimed in claim 12 which comprises a storage tank in which the hot disinfected sewage is held and through which it is conveyed to the spray liquid distribution device.

14. Apparatus as claimed in claim 11 wherein the pressure vessel incorporates a liquid contacting mist eliminator system through which the saturated compressed air passes.

15. Apparatus as claimed in claim 11 further comprising means for diverting a portion of the stream of heated sewage passing from the sewage treatment plant to the heating vessel, to a cooling coil in the pressure vessel and thence back to the stream.

16. Apparatus as claimed in claim 10 wherein the gas turbine is a recuperated gas turbine.

17. The method as claimed in claim 1, wherein the air comprises at least one of fresh air and contaminated air.

18. The method as claimed in claim 2, wherein the air comprises at least one of fresh air and contaminated air.

19. The apparatus as claimed in claim 10, wherein the air comprises at least one of fresh air and contaminated air.

20. The apparatus as claimed in claim 11, wherein the air comprises at least one of fresh air and contaminated air.

21. The method as claimed in claim 1, wherein in the step of heating and disinfecting the sewage is maintained at a temperature below the boiling point of the sewage at ambient pressure to inhibit gas evolution.

\* \* \* \* \*